United States Patent [19]

Davidson et al.

[11] Patent Number: 5,274,761
[45] Date of Patent: Dec. 28, 1993

[54] IMAGING SYSTEM WITH IMAGE BUFFER FOR EXPOSING FILM ON A SUBSTRATE

[75] Inventors: Bruce L. Davidson, East Hartford; Robert V. DeMartino, West Hartford; Ronald J. Straayer, South Windsor, all of Conn.

[73] Assignee: Gerber Systems Corporation, South Windsor, Conn.

[21] Appl. No.: 792,357

[22] Filed: Nov. 14, 1991

[51] Int. Cl.5 .............................................. G06F 15/20
[52] U.S. Cl. ...................... 395/164; 395/162; 358/448; 345/189
[58] Field of Search ............... 395/162, 164–166; 340/798–799, 750; 358/448, 443, 444, 471

[56] References Cited

U.S. PATENT DOCUMENTS

| | | | |
|---|---|---|---|
| 4,658,247 | 4/1987 | Gharachorloo | 395/122 |
| 4,891,768 | 1/1990 | Willems et al. | 395/164 |
| 4,910,683 | 3/1990 | Bishop et al. | 395/164 |
| 4,985,848 | 1/1991 | Pfeiffer et al. | 395/164 |
| 4,989,163 | 1/1991 | Kawamata et al. | 395/112 |
| 5,043,923 | 8/1991 | Joy et al. | 395/164 |

Primary Examiner—Robert L. Richardson
Assistant Examiner—Kee M. Tung
Attorney, Agent, or Firm—McCormick, Paulding & Huber

[57] ABSTRACT

An image buffer for use with laser imagers is configured to receive image signals from a raster image processor (RIP). The image buffer comprises a two by two data switch and two memories for storing image data signals as generated by the RIP. The stored image data signals are presented to the laser imager in accordance with command signals provided by an image buffer controller. The image buffer controller utilizes a video interface that includes a SCSI controller and line buffer to reformat the stored image data signals before presentation to the laser imager, thereby allowing for independent operation of the RIP and laser imager.

9 Claims, 2 Drawing Sheets

IMAGING SYSTEM WITH IMAGE BUFFER FOR EXPOSING FILM ON A SUBSTRATE

TECHNICAL FIELD

This invention relates to laser imaging systems in general and more particularly towards a buffer for interfacing raster image processors with laser imagers.

BACKGROUND OF THE INVENTION

Large area flat bed imagers are known in the art. These devices comprise part of an imaging system and are used to generate high quality printing plates or film for color or black and white printing. A device such as the model LE 55 direct plate imager offered by The Gerber Systems Corporation, the assignee of the present invention, includes an automated flat bed for exposing film or plates with a digitized image. An imager typically scans a substrate with a laser beam, selectively exposing pixels to create the image. The signals needed to drive the imager are generated with a raster image processor such as a "Sun" brand workstation or its equivalent. The digitized signals are then presented to the imager to expose the film.

However, known imaging systems are configured to image data in a continuous serial stream at high rates, while raster image processors can generate data at slower data rates in the case of highly complex images and in different formats. Consequently, it is not possible, in some cases, to generate the raster image signals and directly image the signals unto a substrate. It would be advantages to have a device which would buffer the image signals as they are generated by the raster image processor, thereby allowing for direct and independent processing by the imager to expose a substrate. The present buffer is drawn towards such an invention.

SUMMARY OF THE INVENTION

An object of the present invention is to provide for an image buffer for use with an imaging system that allows for direct and independent imaging of signals received from a raster image processor.

Another object of the present invention is to provide for an image buffer of the foregoing type that switches data signals between storage devices.

Another object of the present invention is to provide an image buffer of the foregoing type whose operation is transparent to the raster image processor.

According to the present invention, an imaging system for use in exposing a film on a substrate includes a computer for generating signals corresponding to a desired image and a raster image processor for receiving the computer image signals and for generating therefrom image data signals comprised of an array of pixels with each of the pixels being in either a first or second state. An imager exposes the film in accordance with the image data signals in response to received image command signals. The image system further comprises an image buffer that receives the image data signals. The image buffer has a first and second memories for storing received image data signals and a data switch for presenting said image data signals to a selected one of the first and second memories in response to switch command signals. An image buffer controller presents image data signals to the imager from a one of the memories not concurrently receiving image data signals from the raster image processor in response to received image command signals. The image buffer controller further generates the switch command signals for selecting a one of the memory means not currently providing image data signals to said imager.

DESCRIPTION OF THE PREFERRED EMBODIMENT

Direct imaging systems are used such as the model LE 55 imager offered by The Gerber Systems Corporation, which is a multi-resolution laser imager for use in generating high quality printing plates or film for color and black and white printing. The imager further comprises a flying spot scanner of a known type with a laser, such as an air cooled argon-ion laser operating at a wavelength of 488 nanometers, providing the exposure beam. Each image is comprised of an array of N pixels, with each pixel having a signal value of a logical "1" or "0" respectively corresponding to a point on the substrate to be exposed or not. Control circuitry presents the laser beam to the substrate to expose the film in accordance with the desired image. Imagers, such as the LE 55 referenced above, have a resolution of between 700 and 5,000 spots per inch (SPI).

Figure 1:
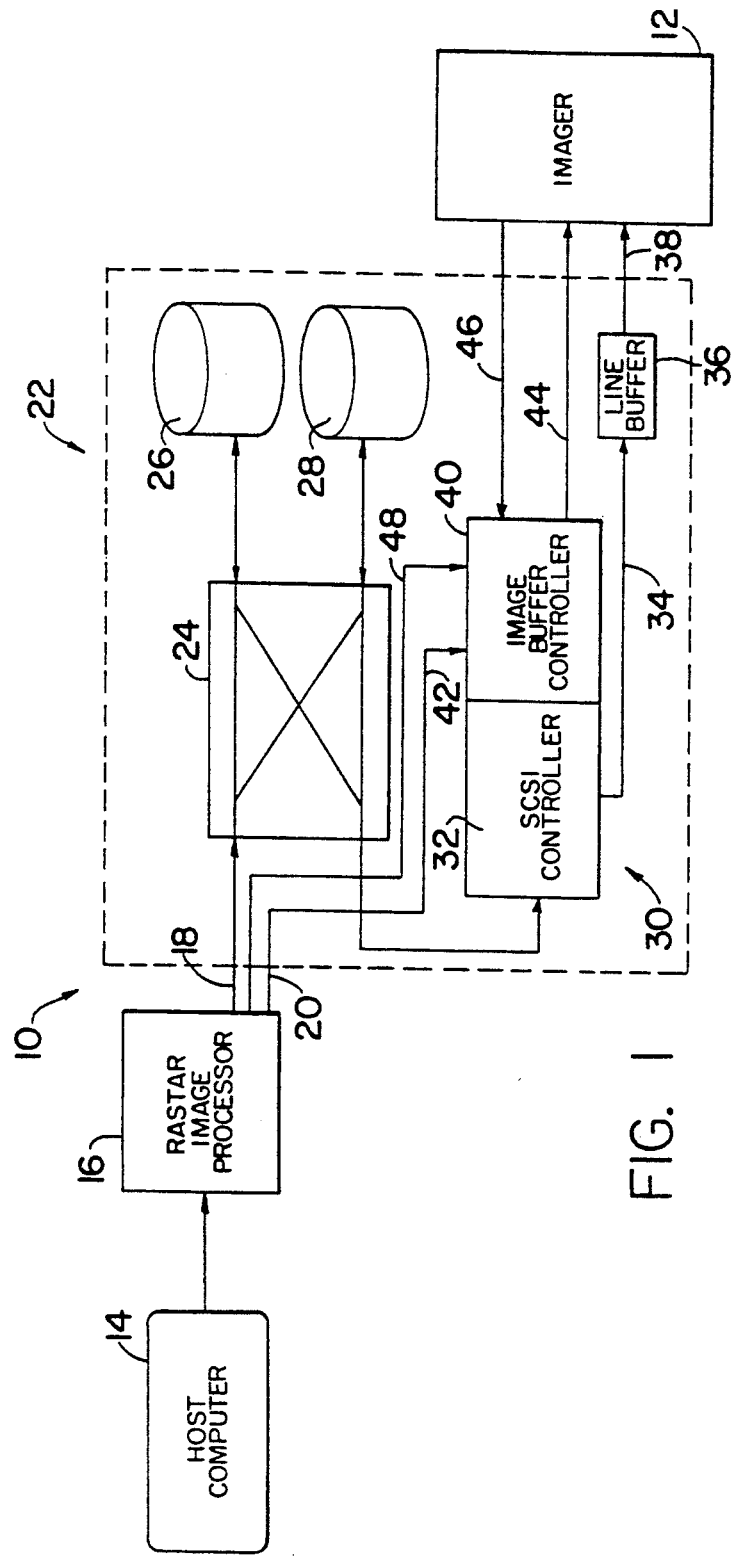
FIG. 1 is a simplified schematic illustration of an imaging system including an image buffer provided according to the present invention.

Referring now to FIG. 1, there is shown an imaging system 10 comprised of an imager 12 of the type described hereinabove. The imaging system further comprises a host computer 14, such as a "Sun" brand workstation for pagination or image assembly. Software associated therewith is used by an operator to generate computer image signals which correspond to the desired image. A raster image processor (RIP) 16 of a type known in the art receives the computer image signals from the host computer to generate image data signals corresponding to a digital representation of the image to be processed. Typically, these signals are in "Postscript" page descriptive language. The raster image processor outputs the data image signals on line 18 in industry standard SCSI format. The raster image processor is configured to output image data signals in the small computer systems interface (SCSI) single ended form, with data rates up to 5 Mbytes per second or differential format up to 10 Mbytes per second. As is conventional, the line length limit for the line 18 is approximately 6 meters. Also output from the raster image processor on line 20 are control and status signals in serial form over an industry standard RS232C port at 9600 baud.

Known imagers are configured to receive data in 16 byte parallel differential format, while command, control and status signals are provided via a RS232C port at 9600 baud, preferably 8 bits per character, no parity and 1 stop bit. Current imagers have data rates in excess of 14 Mbytes per second. Consequently, it is not always possible to generate the image signals with a raster image processor and have the imager directly expose a substrate.

However, an image buffer 22 provided according to the present invention allows for direct image data signal generation and processing. The image buffer comprises a 2×2 port data switch 24 that is used to switch data between two storage devices 26, 28 preferably comprising magnetic disc memories. These storage devices are of a known type and currently are each able to store approximately 1.6 Gbytes with a maximum currently available sustained data rate of 2.5 Mbytes per second.

Further, a video interface 30 is included to retrieve data signals stored on the disc drives and format them to be presented directly to the imager. The video interface comprises an SCSI controller 32 that outputs the image data signals on line 34 in 8 bit parallel format to a line buffer 36 that reconfigures and presents on line 38 these signals in the 16 bit parallel signal format expected by the laser imager.

An image buffer controller 40 is included to receive command signals in serial format from the raster image processor via line 42 to reformat those signals and present them to the imager on line 44 and to control the operation of the data switch as set forth hereinafter. Diagnostic signals are also received from the imager on line 46 by the image buffer controller and are presented on line 48 to the raster image processor and host computer. As noted above, the data rates between the raster image processor and the imager are different. Moreover, some imagers cannot be stopped and started during the process of imaging. The present image buffer is capable of receiving image data signals as presented from the raster image processor while simultaneously providing data image signals to the imager due to the dual storage device architecture.

The preferred image buffer enables a laser imager to operate independently, permitting a single data file or page of text to be raster image processed once and imaged one or more times. The preferred image buffer sends the data to the laser imager when the laser imager is idle. The RIP provides a bit map of the image in either compressed or uncompressed data format. Once the file has been completely processed, the image buffer sends the bit map file as a stream of pixel data to the laser imager. The compressed data format, recommended only when imaging is limited to line art generated, for example, by the Gerber Systems Corporation 9900-510 GPC brand software allows smaller and more economical disc drives to be used with the image buffer. Halftone images require the full bit map uncompressed format.

With two hard disk drives the preferred image buffer can simultaneously transfer pixel data written in one disk to the laser imager while the RIP is writing the next image on the second disk. When the present image buffer is configured with a single hard disk, these two operations are sequential rather than continuous. The hard disk drive(s) appear as a local drive to the RIP.

The RS 232 communication between the RIP and the present image buffer preferably uses XON/XOFF protocol. The RIP can only send to the image buffer after receiving an XON from the image buffer. The image buffer is configured to send to the RIP at any time. Commands are sent from the RIP to the image buffer one at a time. The commands are preferably two character ASCII strings some with one hexadecimal parameter, all followed by a carriage return and or line feed. The commands may be longer than two characters, but only the first two are decoded by the image buffer. At least one blank must be in between command mnemonic and the parameter, if present. If the command received by the image buffer is legal, it will be executed; otherwise an error message will be returned. As a result of the command, the image buffer will return either a status message, an error message or the two character ASCI string "OK" followed by a carriage return. Commands can not be nested in the preferred embodiment. Before sending the next command, the RIP must wait to receive a response for the preceding command.

Figure 2:
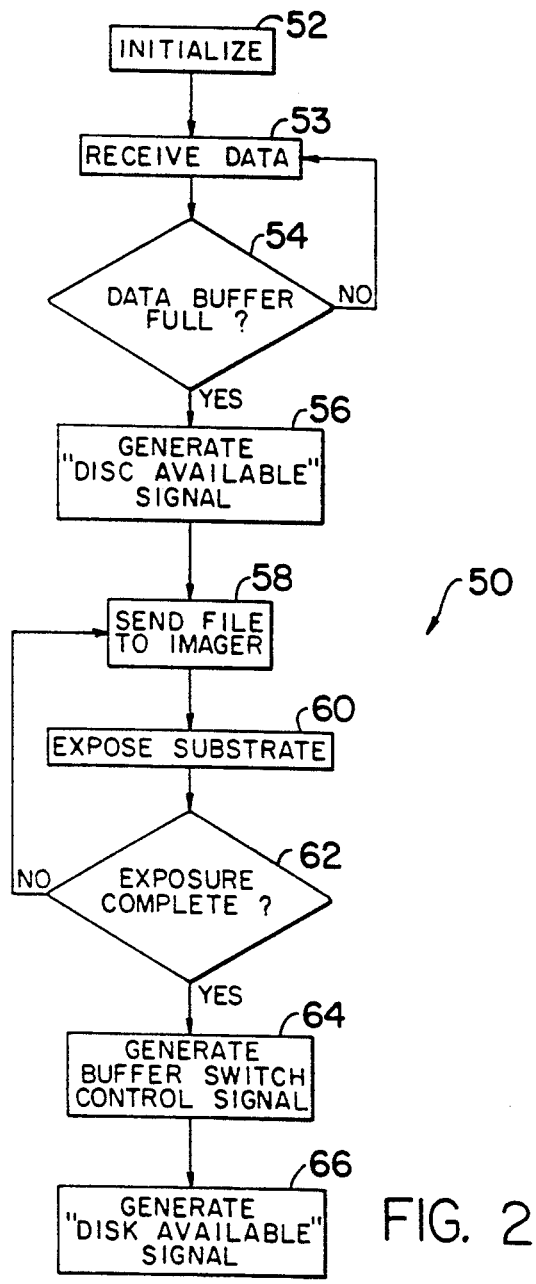
FIG. 2 is a simplified diagrammatic illustration of the operation of an algorithm executed by the image buffer of FIG. 1.

An algorithm 50 executed by the present invention is set forth with respect to FIG. 2. The image buffer is initialized at block 52 so that it can receive data signals from the raster image processor (block 53). The image buffer controller monitors the signals received from the image processor to detect an end of image indication (block 54). Once the first disk memory is full or the image has been received, the image buffer controller generates a "disc available" signal (block 56) and sends the image data signal file to the imager (block 58). Control signals from the raster image processor exposes (block 60) the substrate using the signals presented from the video interface. Once the exposure is complete (block 62), the controller generates a buffer switch control signal (block 64) to switch the data path from disc 26 to disc 28. Thereafter at block 66, the image buffer controller generates a "disc available" signal to the image processor so that newly generated signals can be presented therefrom.

Similarly, although the invention has been shown and described with respect to a preferred embodiment thereof, it should be understood by those skilled in the art that various other changes, omissions and additions thereto may be made therein without departing from the spirit and scope of the present invention.

What is claimed is:

1. An imaging system for use in exposing a film on a substrate, said system comprising:
   a computer means for generating a signals corresponding to a desired image;
   a raster image processor for receiving said computer image signals and for generating therefrom image data signals comprised of an array of pixels each of said pixels being in either a first or second state;
   an imager for exposing said film in accordance with said image data signals in response to received image command signals; and
   an image buffer coupled between said raster image processor and said imager and receiving said image data signals from said raster image processor including;
   a first memory means for storing received image data signals;
   a second memory means for storing received image data signals;
   a data switch means for presenting said image data signals to a selected one of said first and second memory means in response to switch command signals;
   an image buffer controller coupled to said data switch means and generating switch command signals for presenting a first set of image data signals to said imager from said first memory means, and substantially simultaneously storing a second set of image data signals received from said raster image processor in said second memory means, and further generating switch command signals upon transmission of the entire first set of image data signals to the imager for transmitting the second set of image data signals from said second memory means to said imager, and substantially simultaneously storing a third set of image data signals received from said raster image processor in said first memory means.

2. The imaging system of claim 1 wherein said image data signals are in a first data format and wherein said imager is configured to receive image data signals in a second data format, said imaging system further comprising a video interface means for reconfiguring said image data signals received from said raster image processor to said second data format.

3. An image buffer for use with an imaging system that includes a computer means for generating signals corresponding to a desired image, a raster image processor for receiving said computer image signals and for generating therefrom image data signals comprised of an array of pixels each of said pixels being in either a first or second state, an imager coupled to said rater image processor through said image buffer for exposing said film in accordance with said image data signals in response to received image command signals, said image buffer receiving said image data signals and comprising:
  a first memory means for storing received image data signals;
  a second memory means for storing received image data signals;
  a data switch means for presenting said image data signals to a selected one of said firs and second memory means in response to switch command signals; and
  an image buffer controller for presenting a first array of image data signals to said imager from said first memory means in response to received image command signals, and substantially simultaneously storing a second array of image data signals received from said raster image processor in said second memory means, and further generating switch command signals upon completion of transmission of the first array of image data signals to said imager for storing another array of image data signals received from said raster image processor in said first memory means, and presenting the second array of image data signals stored in said second memory means to said imager.

4. An imaging system for exposing a film on a substrate, comprising:
  a computing unit for generating computer image signals corresponding to a desired image;
  a raster image processor coupled to the computing unit for receiving the computer image signals and generating image data signals based on the computer image signals;
  an imager for exposing the film in accordance with the image data signals from the raster image processor; and
  an image buffer coupled between the raster image processor and the imager, including:
    a first memory unit for storing image data signals from the raster image processor,
    a second memory unit for storing image data signals from the raster image processor,
    a data switch coupled to the raster image processor and to the first and second memory units for directing image data signals from the raster image processor to a selected one of the first and second memory units, and
    a controller coupled to the data switch and to the imager, wherein the controller transmits control signals to the data switch to direct an array for image data signals from the raster image processor to the first memory unit, and transmit another array of image data signals stored in the second memory unit to the imager for exposing the film in accordance with the transmitted array of image data signals, and upon completion of transmission of the array of image data signals from the second memory unit to the imager, the controller transmits control signals to the data switch to transmit the array of image data signals stored in the first memory unit to the imager, and direct another array of image data signals from the raster image processor to the second memory unit.

5. An imaging system as defined in claim 4, further comprising an interface unit for changing the image data signals from a first data format into a second data format prior to transmission of the image data signals to the imager.

6. An imaging system as defined in claim 5, wherein the interface unit changes the image data signals from an 8 bit format to a 16 bit form for transmission to the imager.

7. An imaging system as defined in claim 5, wherein the interface unit includes a line buffer for changing the image data signals from a first data format to a second data format.

8. An imaging system as defined in claim 4, wherein the controller further comprises means for receiving command signals in a first data format from the raster image processor and reformatting the command signals and transmitting the command signals to the imager and to the data switch.

9. An imaging system as defined in claim 4, wherein the controller further comprises means for receiving diagnostic signals transmitted by the imager and transmitting the diagnostic signals to at least one of the raster image processor and the computing unit.

* * * * *